United States Patent [19]

Miyao et al.

[11] Patent Number: 4,748,526
[45] Date of Patent: May 31, 1988

[54] HEAD CLEANING CASSETTE FOR MAGNETIC TAPE CASSETTE APPARATUS

[75] Inventors: Hirokazu Miyao, Koganei; Hiroshi Ohkubo, Fussa, both of Japan

[73] Assignee: Teac Corporation, Tokyo, Japan

[21] Appl. No.: 850,756

[22] Filed: Apr. 11, 1986

[30] Foreign Application Priority Data

Apr. 15, 1985 [JP] Japan .............................. 60-54724[U]

[51] Int. Cl.⁴ .............................................. G11B 5/41
[52] U.S. Cl. ............................................... 360/128
[58] Field of Search ......................................... 360/128

[56] References Cited

U.S. PATENT DOCUMENTS 3,761,994 10/1973 Becht ............................. 360/128 X
4,065,801 12/1977 Leaming ........................ 360/128 X Primary Examiner—A. J. Heinz
Attorney, Agent, or Firm—Woodcock Washburn Kurtz Mackiewicz & Norris

[57] ABSTRACT

A cleaning cassette for use in cleaning, with a cleaning stick having a body of cotton or like absorbent material on one end thereof, the magnetic transducer head of an apparatus for data transfer with a magnetic tape cassette. The cleaning cassette has a casing shaped and sized like the tape cassette so as to be loaded in and unloaded from the apparatus through its entrance in the same way as the tape cassette. The cleaning cassette casing has one or more apertures defined in its front side, and a guide passageway for the cleaning stick extends along the front side of the casing. The guide passageway has an entrance end which, when the cleaning cassette is loaded in position in the appearance, is open to the entrance slot of the apparatus. Thus, following the loading of the cleaning cassette in the apparatus, the cleaning stick may be inserted in the guide passageway through the entrance slot of the apparatus and the entrance end of the guide passageway for cleaning the data transfer surface of the transducer head through one of the apertures in the casing.

3 Claims, 4 Drawing Sheets

HEAD CLEANING CASSETTE FOR MAGNETIC TAPE CASSETTE APPARATUS

BACKGROUND OF THE INVENTION

Our invention pertains to a cleaning cassette, or an empty casing in the approximate shape of a magnetic tape cassette, for use in cleaning the magnetic transducer head of an apparatus for data transfer with the magnetic tape cassette. The cleaning cassette of our invention has particular utility in conjunction with magnetic tape cassette apparatus of the type described and claimed in U.S. patent application Ser. No. 658,293 filed Oct. 5, 1984, U.S. Pat. No. 4,701,817 by Uemura and assigned to the assignee of the instant application, although we do not wish our invention to be unnecessarily limited by this particular type apparatus.

As far as we are aware, two different methods have been practiced for cleaning the magnetic transducer head of tape cassette apparatus. One is to manually wipe the head with a cleaning stick having on one end a body of cotton or like absorbent material, with the absorbent body impregnated with a cleaning solution available commercially. The other is to use a cleaning tape cassette having a length of cleaning tape packaged in cassette form just like a magnetic tape cassette.

We object to the use of the cleaning stick alone because it is rather difficult to hold the absorbent body exactly against the gapped data transfer surface of the transudcer head. In the tape cassette apparatus proposed by the noted patent application Ser. No. 658,293, for example, the transducer head is positioned in a confined space and some distance away from a cassette entrance slot defined in the front face of the apparatus and is oriented in a direction parallel to, rather than toward, the entrance slot. Inserted into and through the entrance slot, the cleaning stick may fail to clean the data transfer surface of the head.

Cleaning tape cassettes are much easier to use, and the cleaning tape can be held unfailingly against the head. However, the head will not be cleaned by the cleaning tape as thoroughly as when the cleaning stick is used properly.

SUMMARY OF THE INVENTION

We have hereby found out how to clean the magnetic transducer head of magnetic tape cassette apparatus both easily and positively, by combining the advantages of the cleaning stick and the cleaning tape cassette and eliminating their drawbacks.

Stated in brief, our invention is directed to a cleaning cassette for use with a magnetic tape cassette apparatus having an entrance opening for the insertion and withdrawal of a magnetic tape cassette, comprising a casing shaped and sized like the magnetic tape cassette so as to be loaded in and unloaded from the apparatus through the entrance opening thereof in the same way as the magnetic tape cassette. The casing has defined therein at least one aperture which is positioned opposite the data transfer surface of the transducer head of the apparatus upon loading of the cleaning cassette in position therein. The casing has also defined therein a guide passageway for a cleaning stick. The guide passageway has an entrance end which, when the cleaning cassette is loaded in position in the data transfer apparatus, is open to the entrance opening thereof. The guide passageway extends between this entrance end and the aperture in the casing.

For cleaning the head, the cleaning cassette may be loaded in the data transfer apparatus just like the tape cassette for use therewith. Then a cleaning stick, preferably with its absorbent body impregnated with a cleaning solution, may be inserted in the guide passageway in the cleaning cassette through its entrance end which is exposed through the entrance opening of the apparatus. Guided by the guide passageway, the absorbent body of the cleaning stick will infallibly reach the gapped data transfer surface of the head. The cleaning stick may then be manually moved back and forth, thereby causing the absorbent body to rub against the data transfer surface of the head through the aperture in the cleaning cassette casing, the absorbent body being held against the head by the walls bounding the guide passageway. The head will be cleaned without visually ascertaining the position of the absorbent body with respect to the head.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

Figure 1:
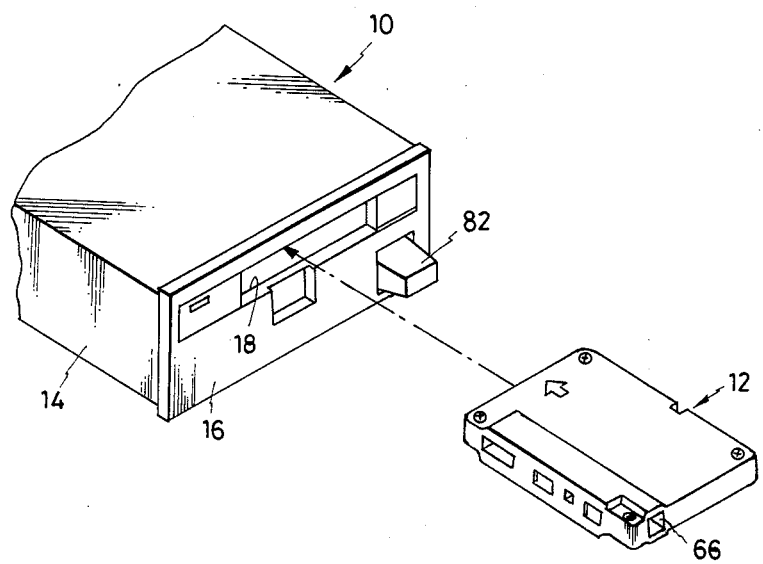
FIG. 1 is a perspective view of the cleaning cassette constructed in accordance with the novel concepts of our invention, together the magnetic tape cassette apparatus for use with the cleaning cassette, the tape cassette apparatus being shown fragmentarily for illustrative convenience.

We will now describe the cleaning cassette of our invention as adapted for use with the data transfer apparatus described and claimed in the aforesaid Uemura patent application Ser. No. 658,293. Generally designated 10 in FIG. 1, the data transfer apparatus is therein shown together with the cleaning cassette 12 of our invention. The data transfer apparatus 10 is a boxlike housing 14 including a front panel 16. Defined in this front panel 16 is an entrance slot or opening 18 for the insertion and withdrawal of a magnetic tape cassette, not shown in FIG. 1, as well as the cleaning cassette 12.

Figure 2:
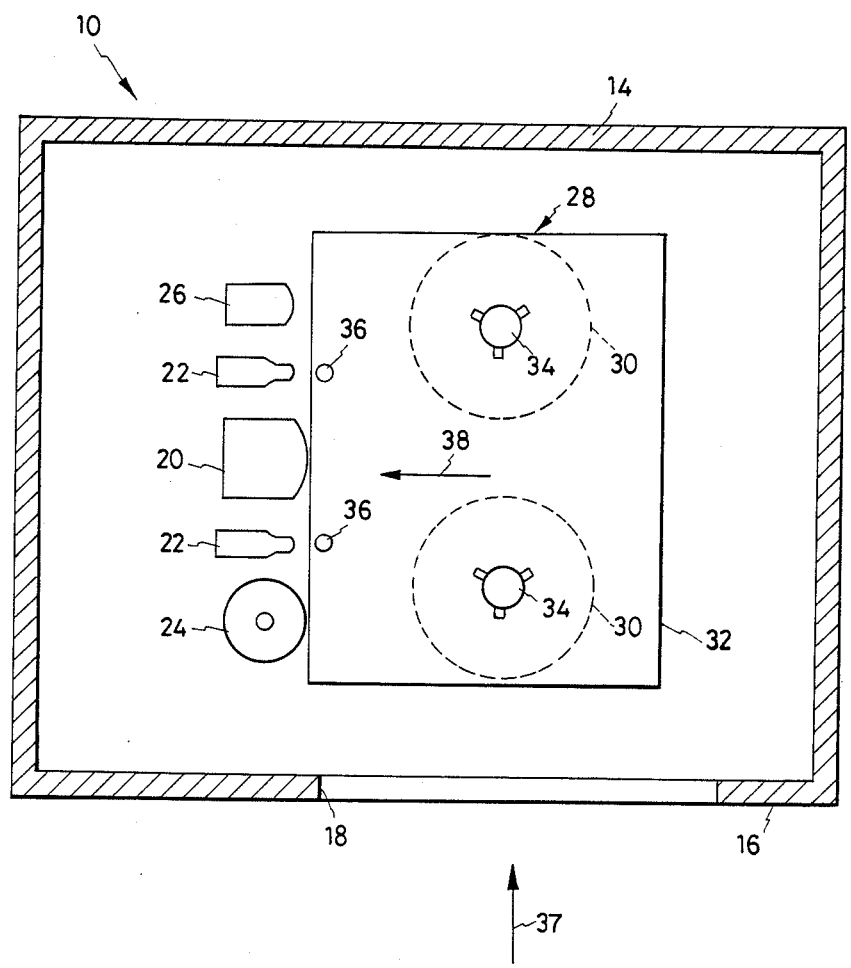
FIG. 2 is an enlarged, diagrammatic horizontal section through the tape cassette apparatus of FIG. 1, showing in particular the magnetic transducer head and neighboring parts of the apparatus to be cleaned with the cleaning cassette, as well as the tape transport mechanism of the apparatus.

As illustrated in FIG. 2, the housing 14 of the data transfer apparatus 10 has mounted therein a magnetic transducer head 20, a pair of tape guides 22, a tape speed sensing roller 24 and a tape beginning and end sensor 26, which are all arranged in a row in a direction at right angles with the front panel 16. Not only the transducer head 20 but also the tape guides 22 and speed sensing roller 24 may be cleaned with the cleaning cassette of our invention.

FIG. 2 also shows the tape transport mechanism 28 of the data transfer apparatus 10. It includes a pair of variable speed electric drive motors 30 mounted to the underside of a tape transport carriage 32, and a pair of drive spindles 34 extending upwardly from the drive motors through holes in the tape transport carriage. The tape transport carriage 32 is movable up and down with respect to the housing 14. A pair of cassette positioning pins 36 are also mounted upstandingly on the tape transport carriage 32.

In the use of this data transfer apparatus 10 the tape cassette is to be inserted longitudinally in the entrance slot 18, as indicated by the arrow 37 in FIG. 2. The apparatus 10 has a cassette shift mechanism, not shown, whereby the loaded tape cassette is transported in the direction of the arrow 38 for data transfer engagement with the transducer head 20. Normally held lowered to its retracted position, the tape transport mechanism 28 will then be raised with the tape transport carriage 32 to its working position for the driving engagement of the drive spindles 34 with the standard hubs or reels of the tape cassette. The cassette positioning pins 36 will also be engaged with the tape cassette for retaining the same in position on the tape transport carriage 32. Reference may be had to the noted Uemura application for further details of this data transfer apparatus 10.

Figure 3:
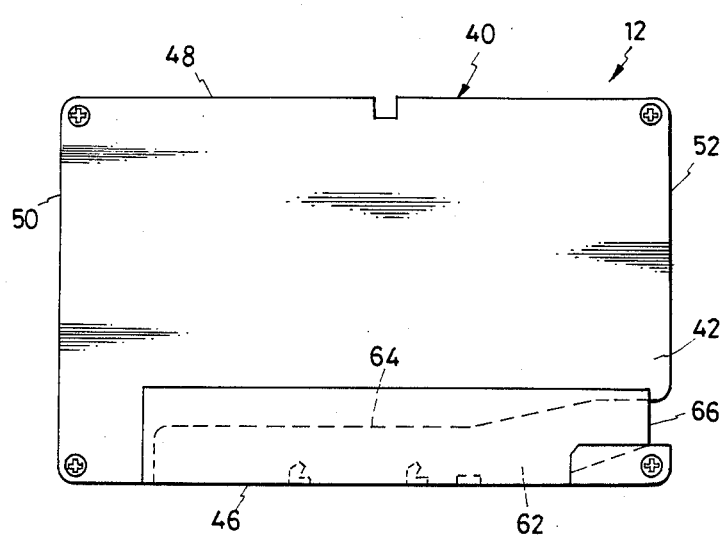
FIG. 3 is an enlarged plan view of the cleaning cassette of FIG. 1.
Figure 5:
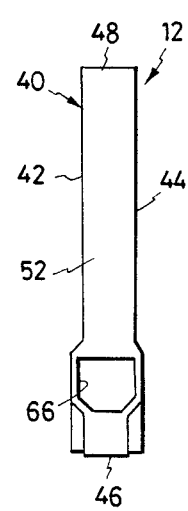
FIG. 5 is a lateral side elevation of the cleaning cassette.
Figure 4:
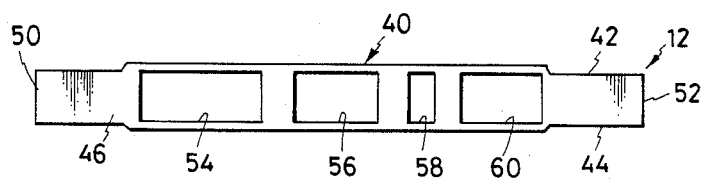
FIG. 4 is a front side elevation of the cleaning cassette.

We have shown the cleaning cassette 12 in detail in FIGS. 3, 4 and 5. The cleaning cassette 12 has a casing 40, preferably molded of a plastic, of generally flat, boxlike shape. The casing 40 is shaped and sized just like the familiar magnetic tape cassette for use with the data transfer apparatus 10, in order to be loaded in and unloaded from the apparatus in the same way as the tape cassette. The casing 40 has a pair of opposite main faces 42 and 44, a front side 46, a rear side 48 opposite to the front side, and a pair of opposite lateral sides 50 and 52. The front 46 and rear 48 sides are longer than the lateral sides 50 and 52, so that the casing 40 is rectangular in shape as seen in a plan view as in FIG. 3.

As pictured in FIG. 1, the cleaning cassette 2 is to be loaded longitudinally in the data transfer apparatus 10, with its lateral side 50 foremost and with its main face 42 directed upwardly. Thus, disposed in position in the data transfer apparatus 10, the cleaning cassette 12 has its front side 46 held opposite the transducer head 20.

With reference again to FIGS. 3 through 5, the cleaning cassette 12 has a series of apertures 54, 56, 58 and 60 in its front side 46. The extreme left hand end aperture 54 is for the admission of one of the tape guides 22 and the tape beginning and end sensor 26. The next aperture 56 to the right is for the admission of the transducer head 20. The next aperture 58 is for the admission of the other tape guide 22. The extreme right hand end aperture 60 is for the admission of the speed sensing roller 24. The magnetic tape cassette for use with the apparatus 10 has a similar row of apertures formed in its front longitudinal side. Unlike the tape cassette, however, the cleaning cassette 12 of our invention has no apertures or holes in its opposite main faces 42 and 44. The nonapertured main faces of the cleaning cassette 12 play an important role in its use with the data transfer apparatus 10, as will be presently explained in more detail.

The casing 40 has a cleaning stick guide passageway 62 formed therein so as to extend along its front side 46. Since the casing 40 is hollow, the guide passageway 62 can be formed simply as a guide wall 64 is formed therein along its front side 46. Thus the guide passageway 62 is defined by the guide wall 64, casing front side 46, and parts of the casing main faces 42 and 44. The guide passageway 62 has an entrance end 66 open to the lateral side 52 of the casing 40. Extending from this entrance end 66 along the front side 46, the guide passageway 62 terminates short of the other lateral side 50 and communicates with all the apertures 54, 56, 58 and 60 in the front side.

Figure 6:
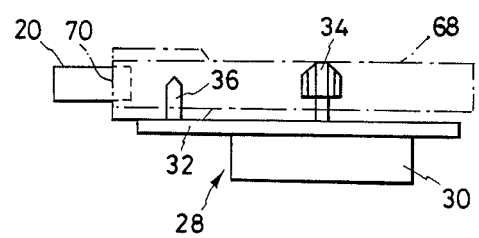
FIG. 6 is a diagrammatic elevation explanatory of the working position to which the tape transport mechanism of the tape cassette apparatus is moved upon loading of the tape cassette in accordance with the prior art.

As illustrated in FIG. 6, the tape transport mechanism 28 of the data transfer apparatus 10 is lifted for the driving engagement of its pair of drive spindles 34 with the hubs, not shown, of the magnetic tape cassette 68 when the latter is loaded in position therein with its front longitudinal side 70 disposed opposite the transducer head 20. The pair of tape guides 36 are also raised with the tape transport mechanism 28 into engagement in the associated holes in the tape cassette 68.

Figure 7:
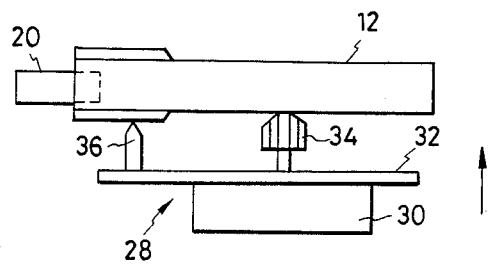
FIG. 7 is a view similar to FIG. 6 except that the tape transport mechanism is shown held retracted upon loading of the cleaning cassette in the apparatus.
Figure 8:
FIG. 8 is an illustration of the cleaning stick for use with the cleaning cassette.

We have stated that the cleaning cassette 12 has no holes or apertures in its main faces 42 and 44. Consequently, when this cleaning cassette is similarly loaded in position in the data transfer apparatus 10, the tape transport mechanism 28 remains locked in its retracted position as in FIG. 7. If the casing 40 of the cleaning cassette 12 were apertured to permit the upward displacement of the tape transport mechanism 28, the tape guides 36 would intrude into the casing 40, hindering the cleaning of the transducer head 20 by the cleaning stick 72, FIG. 8, in the manner set forth hereafter.

The cleaning stick 72 can be of conventional make having a somewhat flexible shank 74 with an absorbent body 76 of elastic material on one end thereof. We recommend that the cross sectional size of the guide passageway 62 be made slightly less than that of the absorbent body 76 of the cleaning stick 72.

Figure 9:
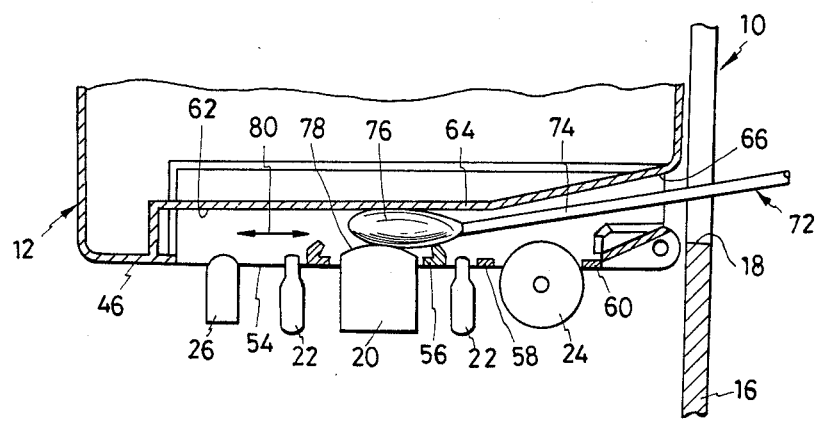
FIG. 9 is a fragmentary horizontal section through the tape cassette apparatus of FIG. 1, shown together with the cleaning cassette loaded in position therein and with the cleaning stick inserted for cleaning the head and neighboring parts of the apparatus.

For cleaning the transducer head 20 and neighboring parts of the data transfer apparatus 10, the cleaning cassette 12 may be inserted in the entrance slot 18 with the correct attitude depicted in FIG. 1. Upon full insertion of the cleaning cassette 12, the unshown cassette shift mechanism of the apparatus 10 will operate to transport the cleaning cassette in the direction of the arrow 38, FIG. 2, to the position of FIG. 9. It will be observed from this figure that the entrance end 66 of the guide passageway 64 within the cleaning cassette 12 is still exposed through the entrance slot 18 of the apparatus 10.

With its absorbent body 76 impregnated with a suitable cleaning liquid, the cleaning stick 72 may be inserted in the guide passageway 62 through its entrance end 66 exposed through the slot 10. Guided by the guide passageway 62, the absorbent body 76 of the cleaning stick 72 will reach the transducer head 20 partly intruding into the cleaning cassette 12 through the aperture 56 in its front side 46. The distance between the gapped data transfer surface 78 of the transducer head 20 and the guide wall 64 bounding the guide passageway 62 is less than the cross sectional size of the absorbent body 76 of the cleaning stick 72. Therefore, by moving the cleaning stick 72 back and forth, as indicated by the double headed arrow 80 in FIG. 9, the absorbent body 76 will strongly rub against the data transfer surface 78 of the head 20, thereby favorably cleaning the same. The pair of tape guides 22 and the speed sensing roller 24 also partly intrude into the guide passageway 62 through the cleaning cassette apertures 54, 58 and 60, so that these members may be cleaned together with the head 20.

The eject button 82, FIG. 1, of the data transfer apparatus 10 may be depressed upon completion of the cleaning. The cassette ejector mechanism, not shown, of the apparatus 10 will then operate to eject the cleaning cassette 12 through the entrance slot 18.

Although we have shown and described our invention in terms of but one preferred embodiment thereof, we recognize, of course, that our invention could be embodied in other forms within the broad teaching hereof. For example, the cleaning cassette of our invention obviously lends itself to use with apparatus of the type wherein the transducer head is moved toward and away from the loaded magnetic tape cassette, instead of being fixed as in the apparatus 10 disclosed herein. Further, although we prefer the illustrated arrangement of the cleaning stick guide passageway along the front longitudinal side of the cleaning cassette, this guide passageway may extend in other directions as required by the relative arrangement of the transducer head and cassette entrance opening in the apparatus with which the cleaning cassette of our invention is intended for use. It will also be apparent that only one aperture could be formed in the front longitudinal side, or in any other side, of the cleaning cassette.

We claim:

1. In combination with a magnetic tape cassette apparatus of the type including a housing defining an entrance slot through which a magnetic tape cassette is to be inserted longitudinally into the housing, and a row of components, including a transducer head, which are disposed within the housing and which are admitted into the tape cassette through a front longitudinal side thereof when the tape cassette is loaded in position within the housing, a cleaning cassette for use in cleaning at least some of the row of components with a cleaning stick having a body of absorbent material on one end of a shank, the cleaning cassette comprising:

(a) a casing shaped and sized like the tape cassette so as to be loaded in and unloaded from the tape cassette apparatus through the entrance slot thereof in the same way as the tape cassette, so that a front longitudinal side of the casing comes opposite the transducer head and other components to be cleaned upon loading of the cleaning cassette in position in the apparatus, the front longitudinal side of the casing being open to admit the row of components when the cleaning cassette is loaded in position in the apparatus; and (b) means for defining within the casing a guide passageway for the cleaing stick extending along the front longitudinal side of the casing, the guide passageway having an entrance end which is an aperture in a side of the cassette extending transverse to said front side wherein when the cleaning cassette is loaded in position in the apparatus said aperture is open to the entrance slot thereof;

(c) whereby, following the loading of the cleaning cassette in position in the apparatus, the cleaning stick can be inserted in the guide passageway through the entrance slot of the apparatus and the entrance end of the guide passageway for cleaning at least some of the row of components, which are admitted into the cleaning cassette through the open front side thereof, by manipulating the cleaning stick back and forth along the guide passageway.

2. The invention of claim 1 wherein the tape cassette apparatus further includes a tape transport mechanism normally held retracted and which, upon loading of the tape cassette in the apparatus, is movable to a working position for driving engagement with the tape cassette in a direction normal to a pair of opposite main faces of the tape cassette, and a pair of cassette positioning pins movable with the tape transport mechanism into and out of engagement with the tape cassette, and wherein the cleaning cassette has a pair of opposite main faces which are closed to prevent the movement of the tape transport mechanism and the cassette positioning pins to the working position when the cleaning cassette is loaded in the apparatus, whereby the desired components of the apparatus can be cleaned without being hindered by the cassette positioning pins.

3. The cleaning cassette of claim 1 wherein the absorbent body of the cleaning stick is elastic, and wherein the guide passageway has a cross sectional size less than the normal cross sectional size of the absorbent body of the cleaning stick.

* * * * *